US008918263B2

(12) United States Patent
Zent et al.

(10) Patent No.: US 8,918,263 B2
(45) Date of Patent: Dec. 23, 2014

(54) TRACTION CONTROL FOR POWER MACHINE

(71) Applicant: Clark Equipment Company, West Fargo, ND (US)

(72) Inventors: Kevin Joseph Zent, Bismarck, ND (US); Matthew James Kaldor, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 105 days.

(21) Appl. No.: 13/830,817

(22) Filed: Mar. 14, 2013

(65) Prior Publication Data

US 2014/0277985 A1 Sep. 18, 2014

(51) Int. Cl.
*B60W 10/18* (2012.01)
*B60T 8/175* (2006.01)

(52) U.S. Cl.
CPC .................................... *B60T 8/175* (2013.01)
USPC ............................................ 701/83; 477/184

(58) Field of Classification Search
USPC ............................................ 701/83; 477/184
See application file for complete search history.

(56) References Cited

U.S. PATENT DOCUMENTS 3,081,836 A 3/1963 Hill
3,288,232 A 11/1966 Sheperd
4,796,718 A 1/1989 Thielen et al.
4,981,190 A 1/1991 Nakayama et al.
5,015,041 A 5/1991 Kuwana et al.
5,149,177 A 9/1992 Fujioka et al.
5,269,596 A 12/1993 Matsuda et al.
5,562,397 A 10/1996 Albright
5,711,025 A 1/1998 Eckert et al.
5,802,489 A 9/1998 Orbach et al.
6,189,643 B1 2/2001 Takahashi et al.
6,208,929 B1 3/2001 Matsuno et al.
6,325,469 B1 12/2001 Carson et al.
6,386,308 B1 5/2002 Takahira et al.

(Continued)

FOREIGN PATENT DOCUMENTS

DE 102010039174 2/2012
WO 02/053427 7/2002

OTHER PUBLICATIONS

PCT/US2013/074133 International Search Report and Written Opinion dated Mar. 6, 2014 (8 pages).

*Primary Examiner* — Mary Cheung
*Assistant Examiner* — Yuen Wong
(74) *Attorney, Agent, or Firm* — Michael Best & Friedrich LLP

(57) ABSTRACT

A disclosed power machine has a power source with a rotational output that drives a first axle assembly with first and second wheels with one of the first and second wheels being a sensed wheel. Wheel speed and rotational speed sensors monitor the rotation speed of the first sensed wheel and the rotational output, respectively. A controller communicates with the wheel speed sensor, the rotational output speed sensor, and a braking system that is operable to brake the first and second wheels. A controller calculates, as a function of the sensed wheel and rotational output speeds, a traction score indicative of whether one of the first wheel and second wheel is slipping and signals to the braking system to brake the first wheel when the traction score indicates that the first wheel is slipping and brake the second wheel when the traction score indicates that the second wheel is slipping.

16 Claims, 7 Drawing Sheets

410
START
415
Traction Control Enabled?
No
Yes
425
Wheel Speed of Sensed Wheel
420
Calculate 1st Traction Score
430
Speed of Rotational Output
440
Brake Sensed Wheel
Yes
435
1st Traction Score < Min Threshold?
No
450
Brake Non-Sensed Wheel
Yes
445
1st Traction Score > Max Threshold?
No

(56) References Cited

U.S. PATENT DOCUMENTS

| | | | |
|---|---|---|---|
| 6,453,226 | B1 | 9/2002 | Hac et al. |
| 6,598,946 | B2 | 7/2003 | Nagae |
| 6,634,451 | B2 | 10/2003 | Sakakiyama |
| 6,702,717 | B2 | 3/2004 | Murakami |
| 6,842,681 | B2 | 1/2005 | Imai et al. |
| 6,873,896 | B2 | 3/2005 | Maekawa et al. |
| 7,125,086 | B2 | 10/2006 | Tanaka et al. |
| 7,258,185 | B2 | 8/2007 | Ohno et al. |
| 7,328,955 | B2 | 2/2008 | Tsukasaki |
| 7,493,982 | B2 | 2/2009 | Kurosawa et al. |
| 7,600,598 | B2 | 10/2009 | Perakes et al. |
| 7,617,902 | B2 | 11/2009 | Perakes et al. |
| 7,693,639 | B2 | 4/2010 | Suzuki et al. |
| 7,779,953 | B2 | 8/2010 | Perakes et al. |
| 7,806,220 | B2 | 10/2010 | Sharma et al. |
| 7,970,513 | B2 | 6/2011 | Yasui et al. |
| 2009/0018742 | A1 | 1/2009 | Takami et al. |
| 2009/0312136 | A1 | 12/2009 | Perakes et al. |
| 2010/0063701 | A1 | 3/2010 | Caporali et al. |
| 2010/0304930 | A1* | 12/2010 | Poulin .......................... 477/184 |

* cited by examiner

TRACTION CONTROL FOR POWER MACHINE

FIELD

This application is directed toward power machines. More particularly, this application is directed toward traction systems for power machines.

BACKGROUND

Power machines of the type discussed are self-propelled vehicles. Many of these vehicles are work vehicles that are capable of performing a variety of tasks. One example of a power machine in the form of a work vehicle is a utility vehicle. Other types of work vehicles include loaders, excavators, tractors, handlers, and the like.

Self-propelled power machines, especially self-propelled work vehicles, often traverse support surfaces that present less than optimal traction conditions. Slippery and/or uneven support surfaces can create traction problems for power machines, even when such vehicles have all wheel drive.

The discussion above is merely provided for general background information and is not intended to be used as an aid in determining the scope of the claimed subject matter.

SUMMARY

In one embodiment discussed in this application, a disclosed power machine has a power source with a rotational output that is coupled to and drives a first axle assembly. The first axle assembly has first and second wheels positioned thereon on respective first and second sides of the power machine with one of the first and second wheels being a sensed wheel. The power machine has a second axle assembly having third and fourth wheels on the respective first and second sides of the power machine. A wheel speed sensor monitors the speed of rotation of the first sensed wheel and a rotational output speed sensor monitors a speed of rotation of the rotational output. A brake system is operable to brake the first and second wheels and a controller is in communication with the wheel speed sensor, the rotational output speed sensor, and the braking system. The controller calculates, as a function of the sensed wheel speed and the rotational output speed, a traction score indicative of whether one of the first wheel and second wheel is slipping and signals to the braking system to brake the first wheel to increase torque delivered from the rotational output to the second wheel when the traction score indicates that the first wheel is slipping, and brake the second wheel to increase torque delivered from the rotational output to the first wheel when the traction score indicates that the second wheel is slipping.

In another embodiment, a method for operating a power machine is disclosed. The power machine includes a power source having a rotational output with first and second axle assemblies. The first axle assembly has first and second wheels on respective first and second sides of the power machine. The second axle assembly has third and fourth wheels on the first and second sides of the power machine, respectively. The method includes driving rotation of the first axle assembly with the rotational output and monitoring a speed of rotation of a sensed wheel chosen from the first wheel and the second wheel and a speed of rotation of the rotational output. A traction score is calculated as a function of the sensed wheel speed and the rotational output speed. The traction score is compared to at least one value indicative of at least one of the first wheel and second wheel slipping to determine whether one of the first wheel and second wheel is slipping. When the first wheel is slipping, the first wheel is braked to increase torque delivered from the rotational output to the second wheel and when the second wheel is slipping, the second wheel is braked to increase torque delivered from the rotational output to the first wheel.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The concepts disclosed herein are not limited in their application to the details of construction and the arrangement of components set forth in the following description or illustrated in the following drawings. That is, the embodiments disclosed herein are illustrative in nature. The concepts illustrated in these embodiments are capable of being practiced or being carried out in various ways. The terminology used herein is for the purpose of description and should not be regarded as limiting. Words such as "including," "comprising," and "having" and variations thereof as used herein are meant to encompass the items listed thereafter, equivalents thereof, as well as additional items.

Figure 1:
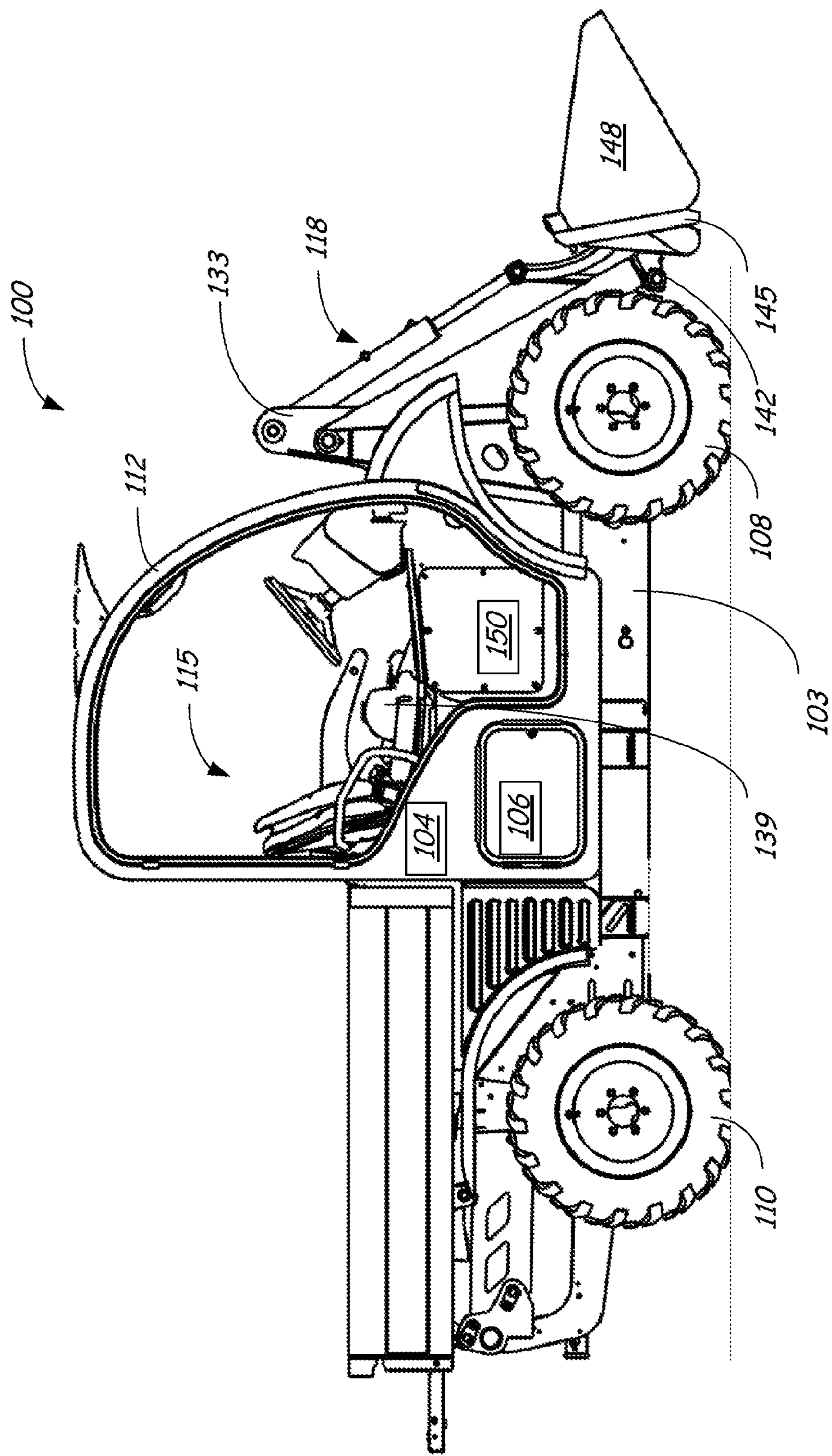
FIG. 1 is a side elevation view of a power machine having a traction control system according to the present invention.

FIG. 1 illustrates a power machine 100 in the form of a utility vehicle upon which embodiments described below can be practiced. The utility vehicle 100 includes a frame 103 supported with front and rear wheel assemblies 108 and 110. A cab 112 that forms an operator compartment 115 is attached to the frame 103. The power machine 100 includes a power source 104 in the form of an engine for driving operation of the power machine 100 mounted on the frame 103 (shown generally in FIG. 1 between the cab 112 and the rear wheel assembly 110). The power source 104 can be an internal combustion engine, but can also be a hydraulic engine, an electric power source, or any other power source capable of providing power to operate a drive system and other functional components on the power machine 100.

The utility vehicle 100 further includes a lift arm assembly 118 pivotally mounted to a lift arm support portion 133 of the frame 103. Pivotal movement of the lift arm assembly 118 can be controlled through operator controls 139 located in the operator compartment 115 and can be powered through the use of hydraulic actuators or other types of electrical or mechanical actuators that receive power from the power source 104. A remote or working end 142 of the lift arm assembly 118 can be connected to an implement carrier 145 that provides an interface for attaching to various implements to the lift arm assembly 118. An implement 148 in the form of a bucket is mounted on the implement carrier 145. The bucket shown in FIG. 1 is but one example of many different types of implements that can be mounting on the implement carrier 145. Other such implements can include, for example, blades, grapples, brooms, augers, pallet forks, etc., none of which are shown. The implement carrier 145 can provide an interface as is disclosed in U.S. Pat. No. 5,562,397, the entire contents of which are hereby incorporated herein by reference.

The power source 104 is connected to one or both of the front and rear wheel assemblies 108 and 110 via a power conversion system 106 with mechanical drives, hydraulic motors or other suitable devices for power transmission. The front and rear wheel assemblies 108 and 110 can include suspension systems coupled to the frame 103. A steering linkage can be coupled to either or both of the front and rear wheel assemblies 108 and 110 so that either or both of the front and rear wheel assemblies 108 and 110 are steerable. Controls 139 for operation of the utility vehicle 100 are located in the operator compartment 115.

In some embodiments, an electronic controller 150 is provided to perform various functions, including monitoring and control of various systems on power machine 100. Electronic controller 150 can be a single electronic control device with instructions stored in a memory device and a processor that reads and executes the instructions to receive input signals and provide output signals all contained within a single enclosure. Alternatively, the electronic controller 150 can be implemented as a plurality of electronic devices coupled on a network. The disclosed embodiments are not limited to any single implementation of an electronic control device or devices. The electronic device or devices that make up electronic controller 150 are programmed and configured by the stored instructions to perform various tasks, including, but not necessarily limited to, those described below.

Figure 2:
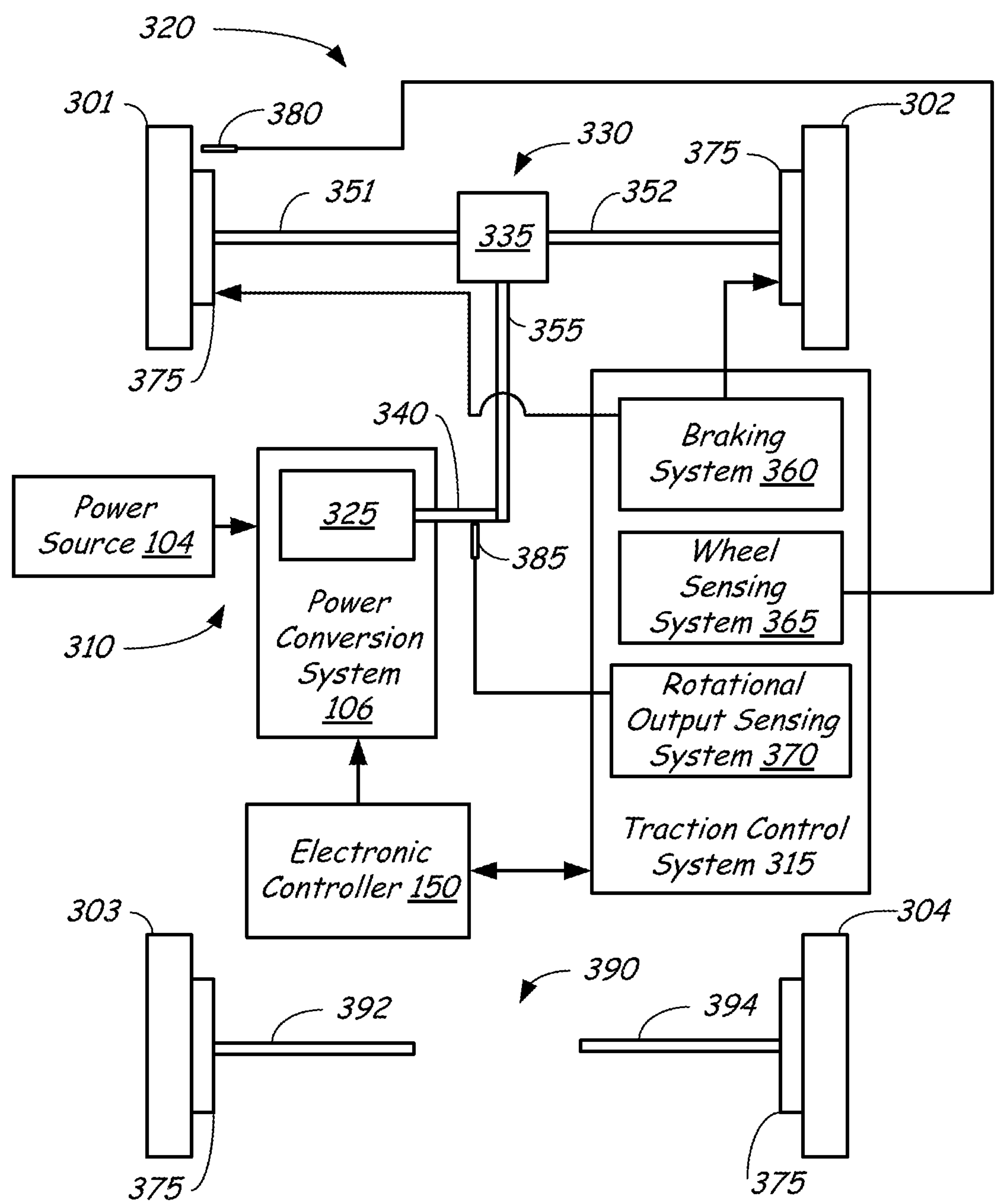
FIG. 2 is a schematic illustration of a portion of a two-wheel drive configuration of the power conversion system of the power machine of FIG. 1.

FIG. 2 schematically illustrates a portion of a drive system 310 suitable for use on power machine 100 that drives rotation of tractive elements such as those found on front and rear wheel assemblies 108 and 110 according to one illustrative embodiment. The tractive elements in the illustrated configuration include first, second, third, and fourth wheels 301, 302, 303, and 304. The first and second wheels 301 and 302 may be referred to as the front wheels of the power machine, and the third and fourth wheels 303 and 304 may be referred to as the rear wheels of the power machine in this example. The first and third wheels 301 and 303 may be referred as the left side wheels, and the second and fourth wheels 302 and 304 may be referred to as the right side wheels of the power machine in this example.

The portion of the power conversion system 106 illustrated in FIG. 2 receives an input from power source 104 and includes a drive mechanism 325, which drives an output shaft 340. In one embodiment, the drive mechanism 325 is a drive motor that receives a power signal in the form of pressurized fluid and converts the power input into the rotational output of output shaft 340. In other configurations, the drive mechanism 325 may be another suitable type of motor, such as an electric motor, or other device. In any event, the motor 325 provides the rotating output shaft 340 that is ultimately driven under the influence of the power machine's power source. The rotating output shaft 340 may therefore be broadly referred to as a rotational output 340 of the power conversion system. The power conversion system 106 can also include a variety of other components related to providing power conversion, including, for example, one or more hydraulic pumps (not shown) that can provide pressurized hydraulic fluid to the drive mechanism 325, as well as various valves, actuators related to functions other than a drive system such as drive system 315. In the embodiment shown in FIG. 2, a controller 150 is in communication with the power conversion system 106 for providing control signals relating to various functions performed by the power conversion 106, including, in some embodiments, providing control signals to drive mechanism 325.

The drive system 310 includes a front drive assembly 320 that has a first axle assembly 330, a differential 335, and an input shaft 355. The first axle assembly 330 includes a left axle 351 and a right axle 352. The left axle 351 is interconnected with the first wheel 301, such that the left axle 351 and first wheel 301 rotate together. The right axle 352 is interconnected with the second wheel 302, such that the right axle 352 and second wheel 302 rotate together. The first wheel 301 is driven by rotation of the left axle 351 and the second wheel 302 is driven by rotation of the right axle 352. The left and right axles 351 and 352 meet in the differential 335. The input shaft 355 is driven by rotation of the rotational output 340 through a torque transfer arrangement to provide in input to the differential 335. Examples of torque transfer arrangements include a gear arrangement and a pulley and drive belt arrangement. The differential 335 converts rotation of the input shaft 355 into rotation of the left and right axles 351 and 352. In this regard, the first axle assembly 330 is operably coupled to and driven by the rotational output 340 through the differential 335. The differential 335 permits the left and right axles 351 and 352 to rotate at different speeds, which is necessary for smooth handling of a power machine that incorporates steerable wheels and axles. Because the differential 335 permits the left and right axles 351 and 352, and therefore the first and second wheels 301 and 302, to rotate at different rates, it will also permit a wheel that has reduced traction (i.e., is slipping) to rotate at a faster rate than the opposite wheel that has good traction. In some embodiments, the differential 335 is a limited slip differential. Alternatively, other types of differentials can be used.

A traction control system 315 is provided for improving the traction of the drive system 330 under certain conditions. The traction control system 315 includes a braking system 360, a wheel sensing system 365, and a rotational output sensing system 370. The controller 150 communicates with the traction control system 315 (i.e., with each of the braking system 360, wheel sensing system 365, and rotational output sensing system 370). As used herein, the term "communicates" and variations thereon, means communication via electronic, hydraulic, electrohydraulic, and electromechanical arrangements. With respect to communication involving the transfer of electronic signals, such communication may be wired communication, wireless communication, or combinations of wired and wireless communication.

The braking system 360 includes a braking assembly 375 associated with each of the first and second wheels 301 and 302. The braking system 360 is operable to brake each of the first and second wheels 301 and 302 independently of each other as is necessary in the disclosed embodiments. The braking system 360 can include various components, and in one configuration includes hydraulic valving for selectively providing pressurized hydraulic fluid to the braking assemblies 375 as required to perform braking operations. Each braking assembly 375 may include calipers and a disc or another form of braking arrangement. Each braking assembly 375 may be actuated to apply an adjustable braking force to the associated wheel. The braking force resists rotation of or slows down the rate of rotation of the wheel to which it is applied. A higher braking force causes the rate of rotation of the wheels to slow down more rapidly than a lower braking force. If the braking force is of sufficient magnitude and is applied for a sufficient duration, rotation of the wheel being braked will eventually stop. The controller 150 controls the magnitude and duration of the applied braking force to the wheels 301 and 302 for the purpose of improving traction in circumstances detailed herein, including in one configuration, controlling hydraulic components of braking systems 360. FIG. 2 shows braking assemblies 375 on wheels 301 and 302 and on wheels 303 and 304, but in the embodiments discussed below braking is applied only to driven wheels for the purpose of controlling the amount of torque provided to each of the driven wheels. Because this configuration is a front-wheel drive configuration, braking the rear wheels would not provide any torque control.

The wheel sensing system 365 includes a first wheel speed sensor 380 proximate the first wheel 301. The first wheel speed sensor 380 monitors the speed of rotation of the first wheel 301, and in this regard the first wheel 301 may be referred to as the first sensed wheel. The first wheel speed sensor 380 communicates wheel speed information to the controller 150. In other configurations, the first wheel speed sensor 380 may be positioned proximate the second wheel 302, in which arrangement the second wheel would be referred to as the first sensed wheel.

The rotational output sensing system 370 includes a first rotational output speed sensor 385 proximate the rotational output 340, such that the first rotational output speed sensor 385 monitors the rotation of the rotational output 340. The first rotational output speed sensor 385 communicates rotational output speed information to the controller 150. In other configurations, the first rotational output speed sensor 385 may be positioned proximate the differential input shaft 355 and monitor the speed of the input shaft 355, or may monitor any other rotating component in the drive train from the power conversion system to the differential 335. In such a configuration, the differential input shaft 355 or other rotating component may be considered part of the overall rotational output of the power conversion system.

The power machine further includes a second axle assembly 390, which in the illustrated configuration includes axles 392 and 394 that are connected to the rear wheels 303 and 304, respectively, on the respective first and second sides of the power machine such as through stub axles. The rear wheels 303 and 304 roll over the terrain and rotate passively and independently.

The drive configuration illustrated in FIG. 2 is a two-wheel drive configuration, and more specifically a front-wheel drive configuration, in which only the front wheels 301 and 302 are driven under power. Another two-wheel drive configuration is a rear-wheel drive configuration, in which the rear wheels 303 and 304 are driven under power and the front wheels are passive. In a rear-wheel drive configuration, the braking and sensing schemes discussed herein would be applied to the rear wheels 303 and 304, as opposed to the front wheels 301 and 302 to improve traction control.

Figure 3:
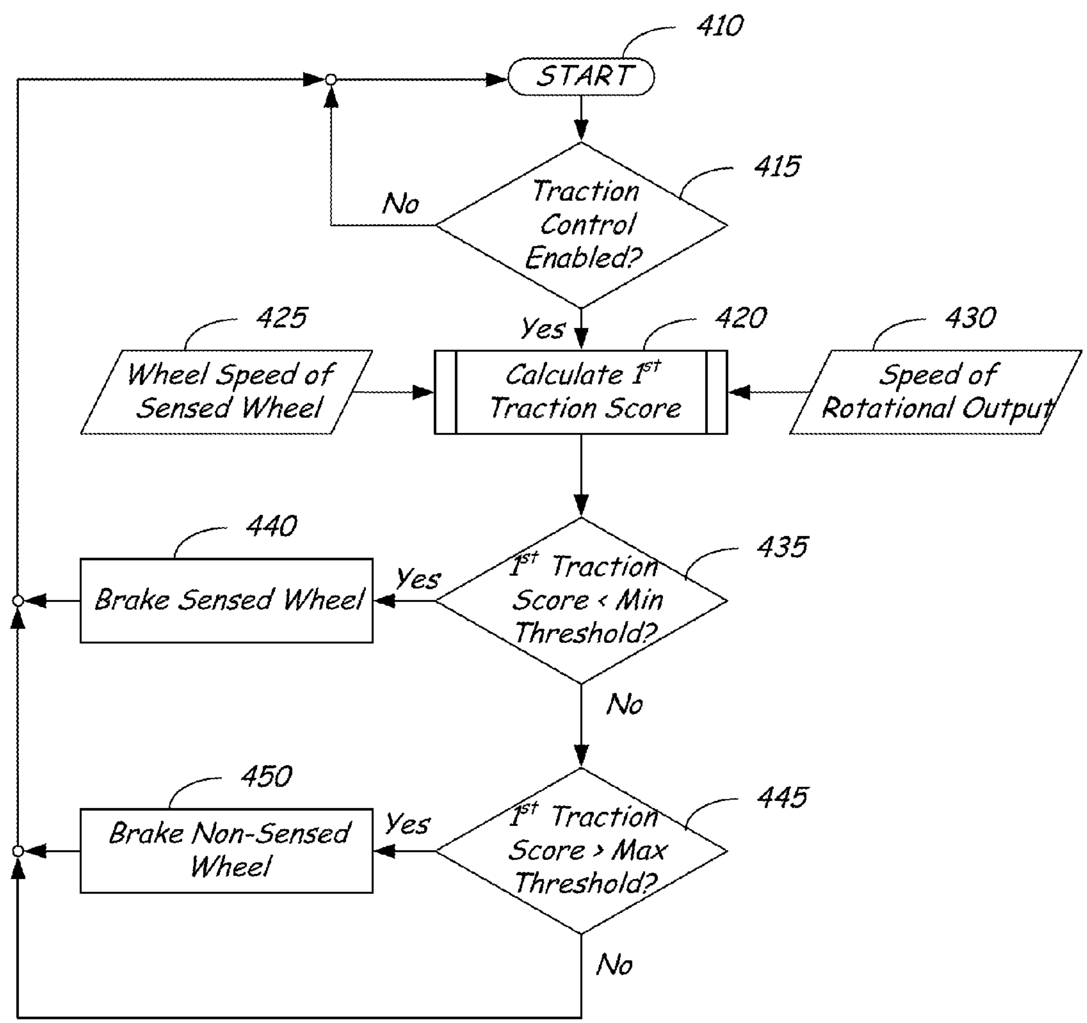
FIG. 3 is a logic flowchart for a traction control system for use with the two-wheel drive configuration of FIG. 2.

FIG. 3 illustrates the logic employed by the controller 150 to operate the traction control system 315 to improve traction of the power machine. In some configurations, the traction control system 315 may have a master switch. The traction control logic starts at step 410. Step 415 reflects the status of the master switch. If the master switch is turned off, the traction control system 315 is not enabled and the logic loops back to step 410. If the master switch is turned on, the logic proceeds from step 415 to step 420.

At step 420, the controller 150 receives wheel speed information and rotational output speed information. The wheel speed information is gathered by the first wheel speed sensor at step 425 and the rotational output speed information is gathered by the rotational output speed sensor 385 at step 430. The controller 150 calculates a first traction score at step 420, based on the information received from steps 425 and 430. The first traction score is a function of the sensed wheel speed and the rotational output speed. The first traction score indicates whether the sensed wheel is rotating faster or slower than expected, by comparing its rate of rotation to that of the rotational output speed.

One example of a first traction score is a ratio of the rotational output speed to the sensed wheel speed. A low value (minimum threshold) and a high value (maximum threshold) are stored in the controller 150. The range between the minimum and maximum thresholds is considered normal operation of the power machine. If the first traction score is outside the range, the first traction score is indicating that one of the wheels 301 and 302 is slipping. For example, if the ratio of rotational output speed to sensed wheel speed is below the minimum threshold, it indicates that the sensed wheel is rotating faster than expected and probably slipping. If the ratio is above the maximum threshold, it indicates that the sensed wheel is rotating slower than expected and the non-sensed wheel is probably slipping. The minimum and maximum thresholds are illustratively selected as ratios below or above which, respectively, it can be reasonably determined that slippage is occurring.

In FIG. 3, it is assumed that a first traction score below the minimum threshold is indicative of the sensed wheel (the first wheel 301 in the example of FIG. 2) slipping. It is further assumed that a first traction score above a maximum threshold is indicative of the non-sensed wheel (the second wheel 302 in the configuration of FIG. 2) slipping.

At step 435, the controller 150 compares the first traction score to the minimum threshold stored in the controller's memory. If the first traction score is below the minimum threshold, the controller moves to step 440, where the controller 150 actuates the brake assembly 375 associated with the slipping sensed wheel to direct more torque to the non-sensed wheel. If at step 435, the first traction score is not below the minimum threshold, the logic moves to step 445.

At step 445, the controller 150 compares the first traction score to the maximum threshold. If the first traction score is above the maximum threshold, the controller 150 moves to step 450, where the controller 150 actuates the brake assembly 375 associated with the slipping non-sensed wheel to direct more torque to the sensed wheel. If at step 445, the first traction score is not above the maximum threshold, the logic returns to step 410 and starts over.

As the braking force is applied in steps 440 and 450 to one wheel, the rate of rotation of the braked wheel slows. As the braked wheel slows, the differential 335 directs more torque to the other wheel, which is presumably not slipping to the extent of the wheel being braked. In this way, more torque is directed to the wheel that has better traction.

To summarize, the controller 150 is in communication with the first wheel speed sensor 380 and the rotational output speed sensor 385, and is in operable communication with the braking system 360. The controller 150 calculates, as a function of the first sensed wheel speed and the rotational output speed, a first traction score indicative of whether one of the first wheel 301 and second wheel 302 is slipping. The controller 150 signals to the braking system 360 to brake the first wheel 301 to increase torque delivered from the rotational output 340 to the second wheel 302 when the first traction score indicates that the first wheel 301 is slipping. The controller 150 signals to the braking system 360 to brake the second wheel 302 to increase torque delivered from the rotational output 340 to the first wheel 301 when first traction score indicates that the second wheel 302 is slipping.

Figure 4:
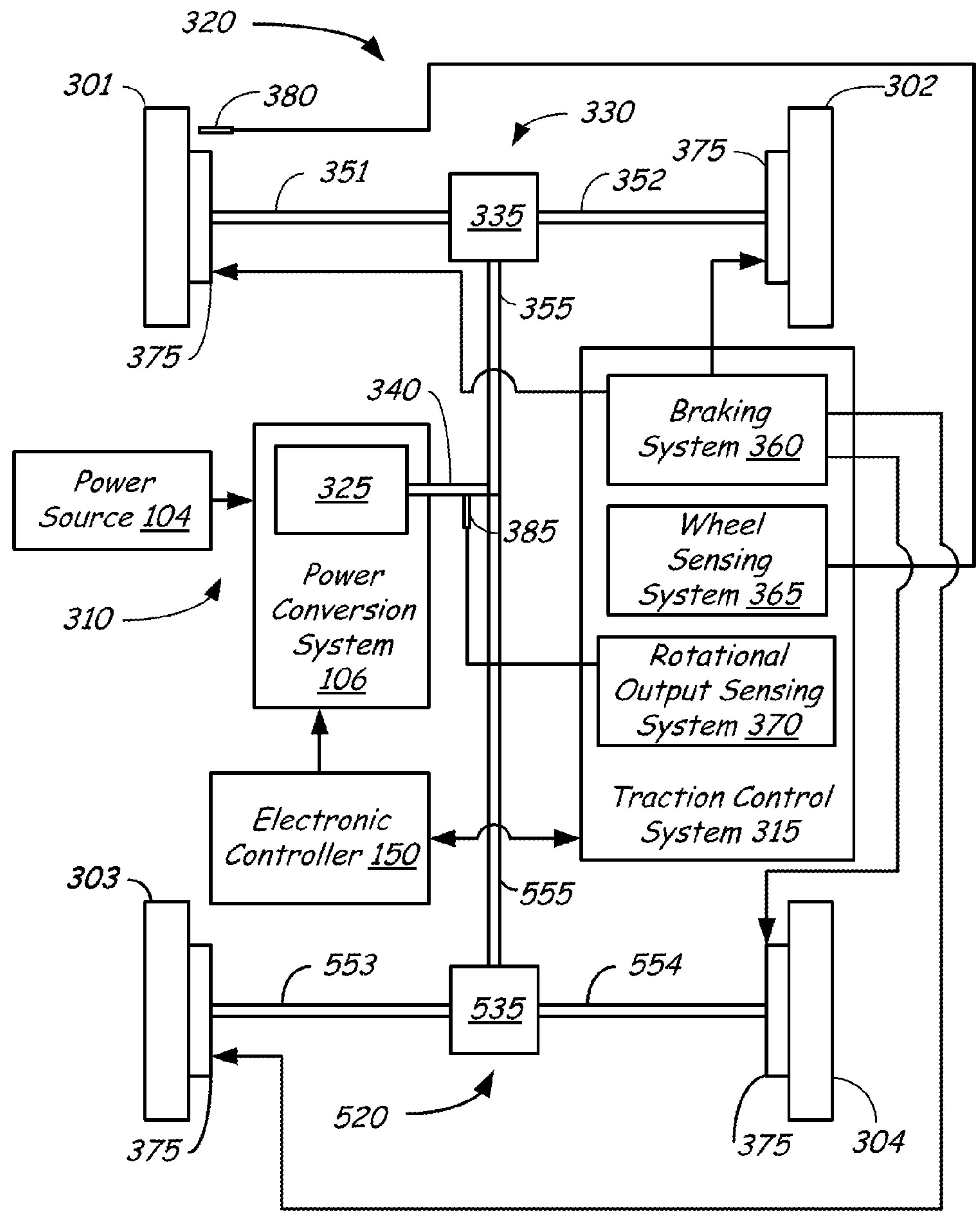
FIG. 4 is a schematic illustration of a portion of a four-wheel drive configuration.

FIG. 4 illustrates a single motor four-wheel drive configuration. All like parts are given the same reference numbers as in FIG. 2. In this configuration, all four-wheels 301, 302, 303, and 304 are driven. The drive assembly 310 in this configuration includes the front drive assembly 320 and a rear drive assembly 520. The rear drive assembly 520 is substantially the same as the front drive assembly 320. The motor 325 is shared by the front drive assembly 320 and the rear drive assembly 520.

The rear drive assembly 520 includes the motor 325, a second axle assembly 530, and a differential 535. The second axle assembly 530 includes a left axle 553 and a right axle 554. The left axle 553 is interconnected with the third wheel 303, such that the left axle 553 and third wheel 303 rotate together. The right axle 554 is interconnected with the fourth wheel 304, such that the right axle 554 and fourth wheel 304 rotate together. The third wheel 303 is driven by rotation of the left axle 553 and the fourth wheel 304 is driven by rotation of the right axle 554. The left and right axles 553, 554 meet in the differential 535.

The differential 535 includes an input shaft 555 that is driven by rotation of the rotational output 340 through a torque transfer arrangement. The differential 535 performs the same function for the rear axles 553, 554 as the differential 335 performs for the front axles 351 and 352.

In the four-wheel drive configuration of FIG. 4, the braking system 360 also includes braking assemblies 375 on the third and fourth wheels 303 and 304. The first wheel speed sensor 380 is proximate the first wheel 301 in FIG. 4, but could be proximate to and monitor any of the first, second, third and fourth wheels 301, 302, 303, and 304 in other configurations.

Figure 5:
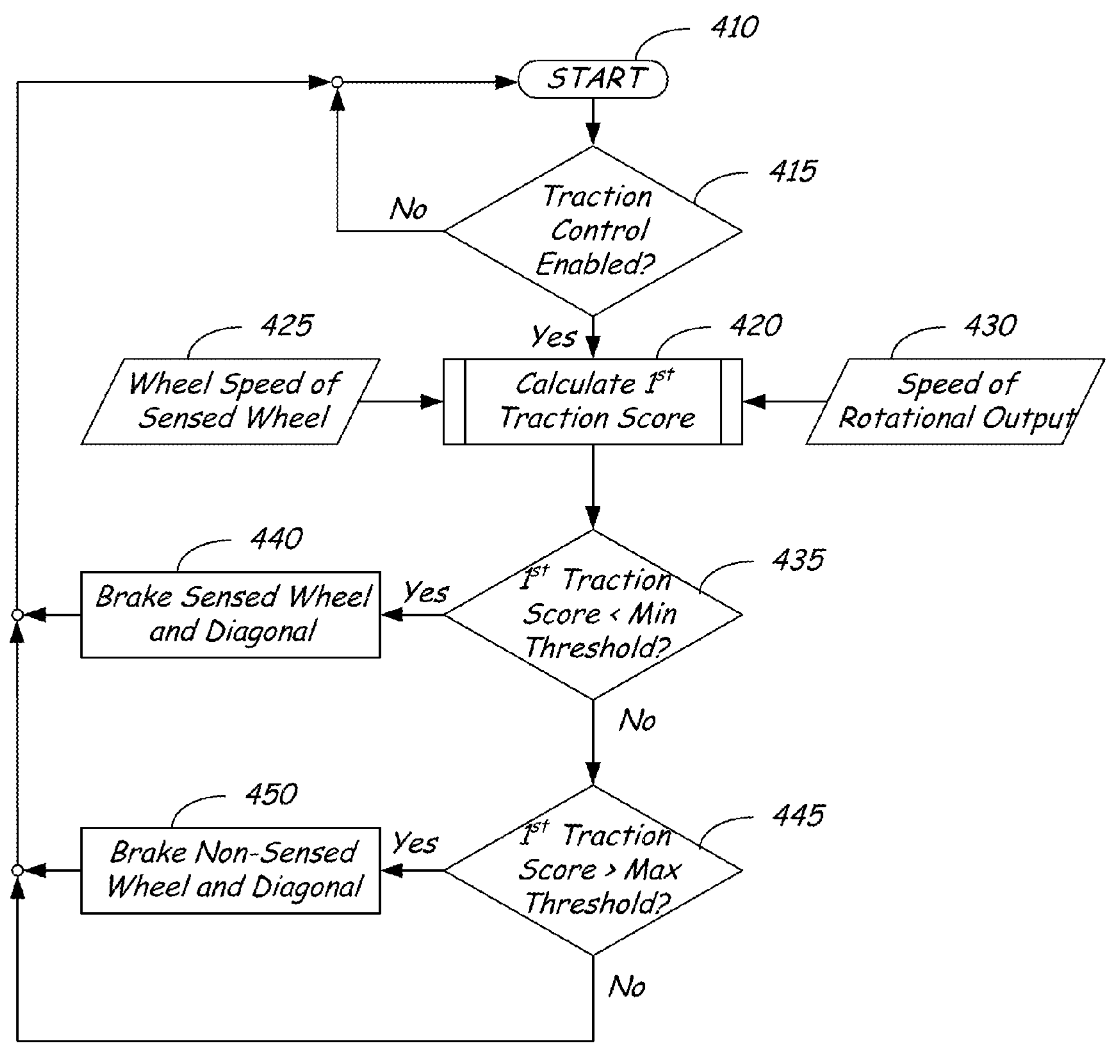
FIG. 5 is a logic flowchart for a traction control system for use with the four-wheel drive configuration of FIG. 4.

FIG. 5 illustrates the traction control logic executed by the controller 150 for the configuration of FIG. 4. To improve handling in a four-wheel drive configuration, the controller 150 typically actuates brake assemblies 375 that are diagonal (e.g., cater-corner) from each other. As a result, some braking systems 360 may be configured to always apply a braking force to the first and fourth wheels 301 and 304 simultaneously and to the second and third wheels 302 and 303 simultaneously. The logic in this configuration is identical to the logic of FIG. 3, except that in steps 440 and 450, the controller 150 automatically brakes the slipping wheel and the wheel diagonal from the slipping wheel. For example, if at step 435 the first traction score is less than the minimum threshold value (e.g., indicating that the sensed wheel is slipping), the controller 150 simultaneously brakes the sensed wheel (e.g., the first wheel 301) and the wheel diagonal from the sensed wheel (e.g., the fourth wheel 304) at step 440. This increases torque to the non-sensed wheel and its diagonal (e.g., the second and third wheels 302 and 303). Likewise, if the traction score is higher than the maximum threshold value (e.g., indicating that the non-sensed wheel is slipping), the controller 150 simultaneously brakes the non-sensed wheel and the wheel diagonal from the non-sensed wheel at step 450, to give the other wheels more torque.

Figure 6:
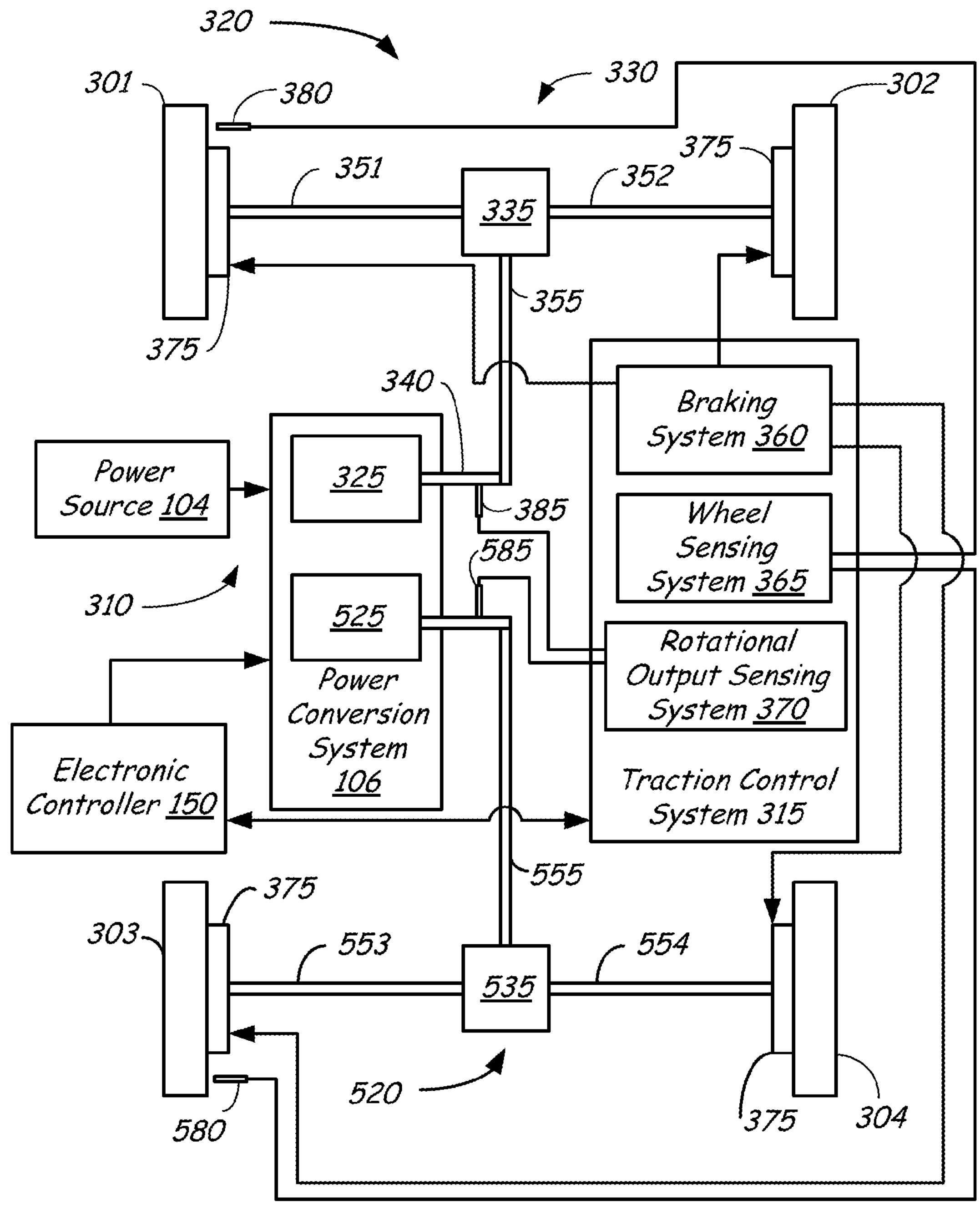
FIG. 6 is a schematic illustration of a portion of another four-wheel drive configuration.

FIG. 6 illustrates another four-wheel drive configuration. All like parts are given the same reference numbers as in FIG. 4. In this configuration, the rear drive assembly 520 includes its own motor 525. The rear motor 525 includes an output shaft 540, which is also considered part of the rotational output, and may be referred to as a second rotational output.

The wheel sensing system 365 in this configuration includes a second wheel speed sensor 580 proximate the third wheel 303, and the third wheel 303 is therefore a second sensed wheel. The second wheel speed sensor 580 monitors the speed of rotation of the third wheel 303, and electronically communicates wheel speed information to the controller 150. In other configurations the second wheel speed sensor 580 may monitor the fourth wheel 304.

The rotational output sensing system 370 in this configuration includes a second rotational output speed sensor 585 proximate the output shaft 540 of the second rotational output 525. The second rotational output speed sensor 585 electronically communicates rotational output speed information to the controller 150. The second rotational output speed sensor 585 may be positioned proximate the rear differential input shaft 555, or any other rotating component in the drive train between the power conversion system and the differential 535. The second rotational output speed sensor 585 may monitor the rotational speed of the input shaft 555 or other rotating component driven by the power conversion system, in which case the rear differential input shaft 555 or other rotating component may be considered the second rotational output. The first and second rotational output speed sensors 385 and 585 monitor the speed of rotation of respective first and second rotating components that are ultimately driven by the power conversion system, and consequently, the first and second rotational speed sensors 385 and 585 monitor respective first and second rotational outputs of the power conversion system.

Figure 7:
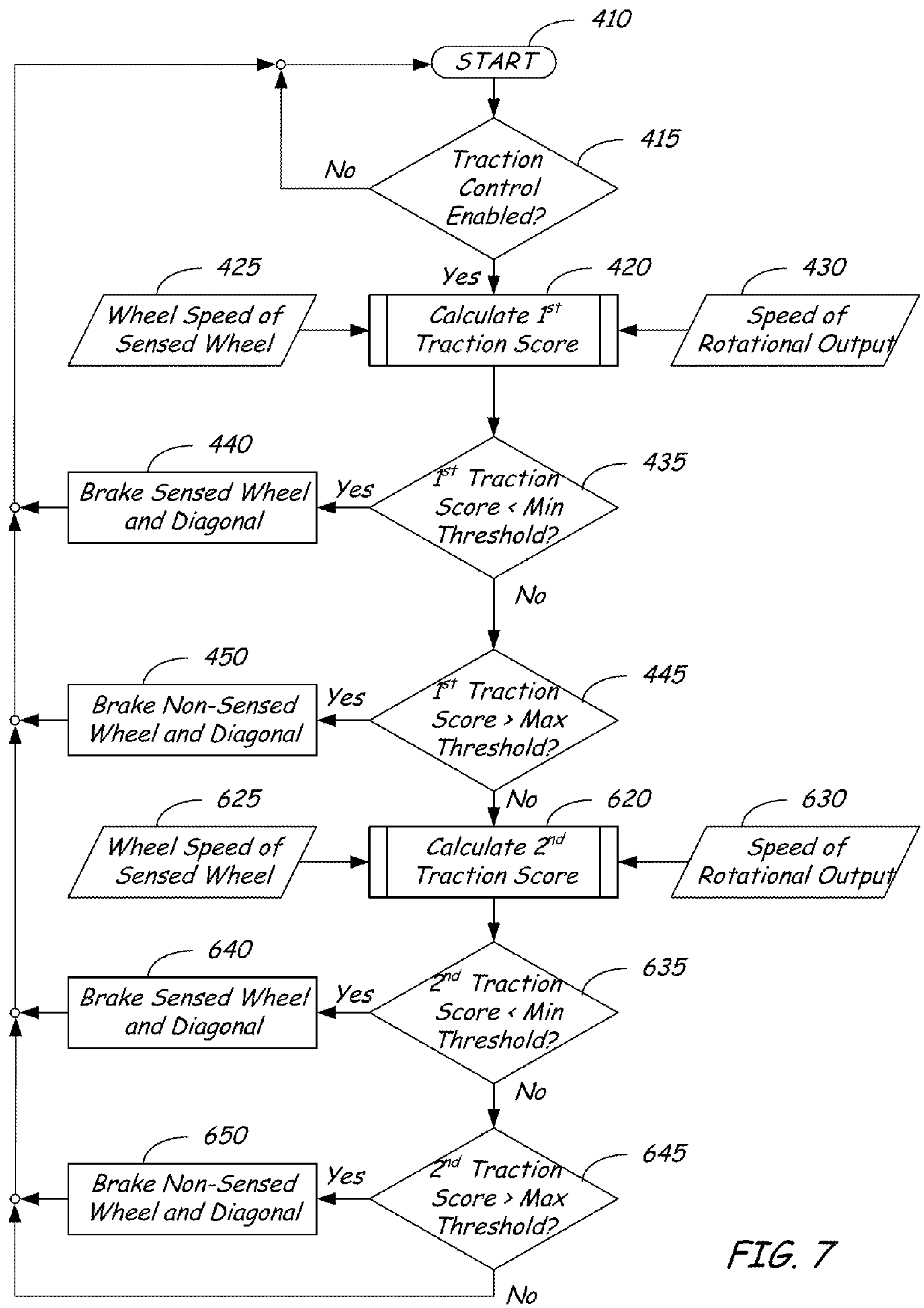
FIG. 7 is a logic flowchart for a traction control system for use with the four-wheel drive configuration of FIG. 6.

FIG. 7 illustrates the traction control logic for the controller 150 in the configuration of FIG. 6. The top portion of the control logic (steps 420, 425, 430, 435, 440, 445, and 450) applies to the front wheels 301 and 302, first wheel speed sensor 380, and first rotational output speed sensor 385. If the first traction score is not indicative of either of the front wheels 301 and 302 slipping, the controller 150 moves from step 445 to the bottom portion of the control logic (steps 620, 625, 630, 635, 640, 645, and 650).

At step 620, the controller 150 receives wheel speed information and rotational output speed information. The wheel speed information is gathered by the second wheel speed sensor 580 at step 625 and the rotational output speed information is gathered by the second rotational output speed sensor 585 at step 630. The controller 150 calculates a second traction score at step 620, based on the information received from steps 625 and 630. The second traction score is preferably calculated in the same manner as the first traction score, but may be calculated in another manner as discussed above.

At step 635, the controller 150 compares the second traction score to the minimum threshold stored in the controller's memory. If the second traction score is below the minimum threshold, the controller moves to step 640, where the controller 150 actuates the brake assembly 375 associated with the slipping sensed wheel and its diagonal, to direct more torque to the non-sensed wheel and its diagonal. If at step 635, the second traction score is not below the minimum threshold, the logic moves to step 645.

At step 645, the controller 150 compares the second traction score to the maximum threshold. If the second traction score is above the maximum threshold, the controller 150 moves to step 650, where the controller 150 actuates the brake assembly 375 associated with the slipping non-sensed wheel and its diagonal, to direct more torque to the sensed wheel. If at step 645, the second traction score is not above the maximum threshold, the logic returns to step 410 and starts over.

Other braking systems may be configured for true independent braking of each slipping wheel, and the invention is intended to function with any configuration of braking assembly. In such arrangements, the controller 150 signals the braking system 360 to brake any of the wheels 301, 302, 303, and 304 independently of the other wheels. In this way the controller 150 may brake only one of the front or one of the rear wheels that is slipping, without also braking the diagonal of the slipping wheel in steps 440, 450, 640, and 650.

The braking system 360 may be configured such that the controller 150 applies a braking force to the slipping wheel (and its diagonal, depending on the braking control configuration) as a function of the traction score. The further the traction score is from the desired range, the more braking force the controller 150 may apply through the braking assembly 375 to shift torque to the non-slipping side.

The embodiments discussed above provide important advantages. By providing a traction control system and method according to the disclosed embodiments on a power machine, operation of the power machine in specific applications will be improved because the power machine will be able to operate in potentially difficult tractive environments. More particularly, the power machine will be able to sense and accommodate for environments where traction on one of side of the power machine is reduced by supplying additional tractive effort to the side of power machine that has a better tractive environment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, different types of power machines can be configured to implement the control valve assembly and power conversion systems and methods. Further, while particular control valve assembly configurations and work functions are illustrated, other valve configurations and types of work functions can also be used. Other examples of modifications of the disclosed concepts are also possible, without departing from the scope of the disclosed concepts.

What is claimed is:

1. A power machine comprising:

a power source having a rotational output;

a first axle assembly operably coupled to and driven by the rotational output and having first and second wheels positioned thereon on respective first and second sides of the power machine, one of the first and second wheels being a first sensed wheel;

a second axle assembly having third and fourth wheels on the respective first and second sides of the power machine;

a first wheel speed sensor monitoring a speed of rotation of the first sensed wheel;

a rotational output speed sensor monitoring a speed of rotation of the rotational output;

a braking system operable to brake one of the first and second wheels;

a controller in communication with the first wheel speed sensor and rotational output speed sensor and operably communicating with the braking system; and wherein the controller calculates, as a function of the first sensed wheel speed and the rotational output speed, a first traction score indicative of whether one of the first wheel and second wheel is slipping; and wherein, based on the first traction score, the controller signals to the braking system to brake the first wheel to increase torque delivered from the rotational output to the second wheel when the first traction score indicates that the first wheel is slipping or to brake the second wheel to increase torque delivered from the rotational output to the first wheel when the first traction score indicates that the second wheel is slipping, wherein the controller calculates the first traction score by calculating a ratio of the rotational output speed to the first sensed wheel speed; wherein the ratio is indicative of the second wheel slipping when the first traction score is above a maximum threshold value, and wherein the ratio is indicative of the first wheel slipping when the first traction score is below a minimum threshold value.

2. The power machine of claim 1, wherein the second axle assembly is also driven by the rotational output; wherein the braking system is operable to brake one of the third and fourth wheels; and wherein the controller signals the braking system to brake the fourth wheel simultaneously with the first wheel when the first traction score indicates that the first wheel is slipping, and brake the third wheel simultaneously with the second wheel when the first traction score indicates that the second wheel is slipping.

3. The power machine of claim 1, wherein the second axle assembly is also driven by the rotational output; wherein the braking system is operable to brake one of the third and fourth wheels; wherein one of the third and fourth wheels is a second sensed wheel; the power machine further comprising:

a second wheel speed sensor monitoring a speed of rotation of the second sensed wheel and communicating with the controller;

wherein the controller calculates, as a function of the second sensed wheel speed and the rotational output speed, a second traction score indicative of whether one of the third wheel and fourth wheel is slipping; and wherein, based on the second traction score, the controller signals the braking system to brake the third wheel to increase the torque from the rotational output to the fourth wheel when the second traction score indicates that the third wheel is slipping or to brake the fourth wheel to increase the torque from the rotational output to the third wheel when the second traction score indicates that the fourth wheel is slipping.

4. The power machine of claim 3, wherein the controller calculates the second traction score by calculating a ratio of the rotational output speed to the third wheel speed; wherein the ratio is indicative of the fourth wheel slipping when above a first stored value; and wherein the ratio is indicative of the third wheel slipping when below a second stored value.

5. The power machine of claim 3, wherein:

the rotational output includes a first rotational output driving the first axle assembly and a second rotational output driving the second axle assembly;

the rotational output sensor includes a first rotational output sensor monitoring the rotational speed of the first rotational output and a second rotational output sensor monitoring the rotational speed of the second rotational output;

the controller calculates the first traction score as a function of the first sensed wheel speed and the first rotational output speed; and the controller calculates the second traction score as a function of the second sensed wheel speed and the second rotational output speed.

6. The power machine of claim 1, wherein the controller signals the braking system to brake one of the first and second wheels with a braking force that is a function of the first traction score.

7. A power machine comprising:

a power source having a rotational output;

a first axle assembly operably coupled to and driven by the rotational output and having first and second wheels positioned thereon on respective first and second sides of the power machine, one of the first and second wheels being a first sensed wheel;

a second axle assembly operably coupled to and driven by the rotational output and having third and fourth wheels positioned thereon on the respective first and second sides of the power machine;

a first wheel speed sensor monitoring a speed of rotation of the first sensed wheel;

a rotational output speed sensor monitoring a speed of rotation of the rotational output;

a braking system operable to brake one of the first and second wheels;

a controller in communication with the first wheel speed sensor and rotational output speed sensor and operably communicating with the braking system; and wherein the controller calculates, as a function of the first sensed wheel speed and the rotational output speed, a first traction score indicative of whether one of the first wheel and second wheel is slipping; and wherein, based on the first traction score, the controller signals to the braking system to brake the second wheel to increase torque delivered from the rotational output to the first wheel when the first traction score is above a maximum threshold value indicating that the second wheel is slipping or to brake the first wheel to increase torque delivered from the rotational output to the second wheel when the first traction score is below a minimum threshold value indicating that the first wheel is slipping.

8. The power machine of claim 7, wherein the braking system is operable to brake the third and fourth wheels; and wherein the controller signals the braking system to brake the fourth wheel simultaneously with the first wheel when the first traction score indicates that the first wheel is slipping, and brake the third wheel simultaneously with the second wheel when the first traction score indicates that the second wheel is slipping.

9. The power machine of claim 7, wherein the braking system is operable to brake one of the third and fourth wheels; wherein one of the third and fourth wheels is a second sensed wheel; the power machine further comprising:

a second wheel speed sensor monitoring a speed of rotation of the second sensed wheel and communicating with the controller;

wherein the controller calculates, as a function of the second sensed wheel speed and the rotational output speed, a second traction score indicative of whether one of the third wheel and fourth wheel is slipping; and wherein the controller signals the braking system to brake the third wheel to increase the torque from the rotational output to the fourth wheel when the second traction score indicates that the third wheel is slipping, and brake the fourth wheel to increase the torque from the rotational output to the third wheel when the second traction score indicates that the fourth wheel is slipping.

10. A method for operating a power machine that includes a power source having a rotational output, a first axle assembly, a first wheel on the first axle assembly on a first side of the power machine, a second wheel on the first axle assembly on a second side of the power machine, a second axle assembly, a third wheel on the second axle assembly on the first side of the power machine, and a fourth wheel on the second axle assembly on the second side of the power machine, the method comprising:

driving rotation of the first axle assembly with the rotational output;

monitoring a speed of rotation of a sensed wheel that is the first wheel or the second wheel;

monitoring a speed of rotation of the rotational output;

calculating, by a processor, a traction score as a function of the sensed wheel speed and the rotational output speed; and comparing, by the processor, the traction score to at least one value indicative of at least one of the first wheel and second wheel slipping to determine whether one of the first wheel and second wheel is slipping;

wherein in response to the determination that the first wheel is slipping, braking the first wheel to increase torque delivered from the rotational output to the second wheel, or in response to the determination that the second wheel is slipping, braking the second wheel to increase torque delivered from the rotational output to the first wheel, wherein calculating a traction score includes calculating a ratio of the rotational output speed to the sensed wheel speed;

wherein comparing the traction score to at least one value includes comparing the traction score to a maximum threshold value indicative of the second wheel slipping and a minimum threshold value indicative of the first wheel slipping.

11. The method of claim 10, wherein braking the first wheel includes braking the first wheel with a braking force that is a function of the traction score; and wherein braking the second wheel includes braking the second wheel with a braking force that is a function of the traction score.

12. The method of claim 10, further comprising:

driving rotation of the second axle assembly with the rotational output;

in response to a determination that the first wheel is slipping, braking the fourth wheel simultaneously with the first wheel; and in response to a determination that the second wheel is slipping, braking the third wheel simultaneously with the second wheel.

13. The method of claim 10, further comprising:

driving rotation of the second axle assembly with the rotational output;

monitoring a speed of rotation of a second sensed wheel that is the third wheel or fourth wheel;

calculating, by the processor, a second traction score as a function of the second sensed wheel speed and the rotational output speed;

comparing, by the processor, the second traction score to at least one value indicative of at least one of the third wheel and fourth wheel slipping to determine whether one of the third wheel and fourth wheel is slipping;

wherein in response to the determination that the third wheel is slipping, braking the third wheel to increase torque delivered from the rotational output to the fourth wheel, or in response to a determination that the fourth wheel is slipping, braking the fourth wheel to increase torque delivered from the rotational output to the third wheel.

14. The method of claim 13, wherein calculating a traction score includes calculating a ratio of the rotational output speed to the sensed wheel speed; and wherein calculating a second traction score includes calculating a ratio of the rotational output speed to the second sensed wheel speed.

15. The method of claim 13, wherein comparing the traction score to at least one value includes comparing the traction score to a first value indicative of the first wheel slipping and to a second value indicative of the second wheel slipping; and wherein comparing the second traction score to at least one value includes comparing the second traction score to a third value indicative of the third wheel slipping and to a fourth value indicative of the fourth wheel slipping.

16. The method of claim 10, wherein the rotational output includes a first rotational output and a second rotational output; wherein driving rotation of the first axle assembly includes driving rotation of the first axle assembly with the first rotational output; the method further comprising:

driving rotation of the second axle assembly with the second rotational output;

monitoring a speed of rotation of a second sensed wheel that is the third wheel or the fourth wheel;

monitoring the rotational speed of the second rotational output;

calculating, by the processor, a second traction score as a function of the second sensed wheel speed and the second rotational output speed;

comparing, by the processor, the second traction score to at least one value indicative of at least one of the third wheel and fourth wheel slipping to determine whether one of the third wheel and fourth wheel is slipping;

wherein in response to the determination that the third wheel is slipping, braking the third wheel to increase torque delivered from the second rotational output to the fourth wheel, or in response to the determination that the fourth wheel is slipping, braking the fourth wheel to increase torque delivered from the second rotational output to the third wheel.

* * * * *